United States Patent Office 3,306,953
Patented Feb. 28, 1967

3,306,953
STABILIZATION OF POLYOXYMETHYLENES WITH A POLYAMIDE PREPARED BY THE REACTION OF A DIMER OR TRIMER OF AN UNSATURATED FATTY ACID WITH A POLYAMINE
Robert Fourcade, Gosnay, Thérèse Van De Walle, Labuissiere, and Henri Sack, Creil, France, assignors to Houilleres du Bassin du Nord & du Pas-de-Calais, Douai, Nord, France, a French public establishment
No Drawing. Filed Jan. 7, 1964, Ser. No. 336,115
Claims priority, application France, Jan. 10, 1963, 921,044
5 Claims. (Cl. 260—857)

This invention is concerned with a process of stabilising polyoxymethylenes.

It is known that a polyoxymethylene of high molecular weight prepared either by polymerisation of gaseous formaldehyde in an inert solvent or by polymerisation of trioxan by various processes and particularly by ionising irradiation, does not provide a commercially acceptable plastics material unless it is stabilised against various types of degradation.

It is known that polyoxymethylenes containing terminal hydroxyl groups have a tendency to degrade easily by retrogradation of the chain. Blocking the extremities of the chain by esterification or etherification prevents the decomposition of the polymeric molecules at the extremities of the chain. This known process is one method used to improve the stability of the polymers.

It is also known, in order to prevent the oxidation of the polymer chains, to add anti-oxidants to polyoxymethylenes; suitable anti-oxidants are generally of the family of phenols or amines.

In addition, it has been suggested that certain compounds when added to polyoxymethylenes behave as what may be termed "formaldehyde acceptors." The addition of these compounds completes the treatments indicated above and prevents the degradation of polyoxymethylenes during hot working of the latter. Among the compounds which can be used for this purpose are hydrazines and their derivatives, urea, certain amides and diamides, in particular the diamide of malonic acid, polymethacrylamide, methyl methacrylate—methacrylamide copolymers, and polyamides such as the condensation products of the following amines and acids:

1,1,6,6-tetramethylhexamethylene-diamine/adipic acid,
2,11-diaminodecane/2,2,5,5-tetramethyladipic acid,
2,5-dimethylpiperazine/glutaric acid,
2,5-dimethylpiperazine/suberic acid,
bis-3-aminopropylether/adipic acid, and the terpolymer of 38% polycaprolactam, 35% polyhexamethylene adipamide and 27% polyhexamethylene sebacamide.

While formaldehyde acceptors may be effective in reducing degradation of polyoxymethylenes, they are only useful in a commercial plastics material insofar as they possess a combination of the following properties; non-toxicity; substantial insolubility in common solvents, in particular water, and stability to hydrolysis; and ease of working. In particular, it is apparent that it must be possible to obtain the product in an extremely finely divided state so as to permit complete homogenisation of the latter in the polyoxymethylene powder at little cost; only if good dispersion of the additive is obtained will the finished polyoxymethylene product be unblemished. Certain of the compounds mentioned above are lacking in one or other of these properties. The following cases can be cited by way of example:

The diamide or malonic acid is a good formaldehyde acceptor, but its high solubility in water (500 g. in 1 litre of water at 100° C.) prohibits its industrial use.

The terpolymer of 38% polycaprolactam, 35% polyhexamethylene adipamide and 27% polyhexamethylene sebacamide, which is an effective formaldehyde acceptor, has the serious disadvantage that it is readily hydrolysed. This product is totally hydrolysed by normal aqueous hydrochloric acid at 100° C. in about 10 hours. It is also very difficult to grind because it is elastic and in order to obtain it in powder form, it is necessary to reprecipitate it after dissolving it in a solvent, a procedure which is difficult and delicate to carry out. These two defects constitute a serious difficulty.

We have now found another class of products which have good properties as formaldehyde acceptors and which do not have these disadvantages.

According to the present invention, therefore, we provide a process for the stabilisation of polyoxymethylenes which comprises adding to a polyoxymethylene a polyamide obtained by the condensation of a dimer or trimer of an unsaturated fatty acid containing at least 10 carbon atoms with at least the stoichiometric quantity of a diamine or a triamine.

The present invention also comprises polyoxymethylene compositions containing, as stabilising agent, a polyamide of this type.

Suitable proportions of the polyamide are, for example, from 0.5 to 2.0% by weight based on the weight of polyoxymethylene polyamides of this type. Particularly suitable are those sold by Schering and General Mills under the trade name "Versamid."

The acid acceptors used according to the invention are branched due to the presence in the acids and/or amides of at least one trifunctional component; they comprise unsaturated bonds which are in part present in the form of cyclohexene (which has an antioxidant character) and in part in the form of olefinic side chains. These products are not toxic and they are stable in air up to 230° C.

In particular, the products known under the trade names "Versamid" 900, 930, 940 and 950 are solid resins which can very easily be ground into a fine powder by conventional grinders and which are insoluble in the majority of industrial solvents, in particular, water, oils, greases and other common solvents. They are not hydrolysed by aqueous hydrochloric acid under the conditions indicated above.

In order to indicate the effectiveness of these resins, the results of tests carried out on a polyoxymethylene acetate containing 0.5% of antioxidant and the indicated proportion of stabilising compound are given in the following table.

| Stabilising compound | Percent of stabilising compound | $K_{222}$, percent per minute |
|---|---|---|
| | 0 | 0.12 |
| Versamid 900 | 0.6 | 0.03 |
| Do | 1.8 | 0.014 |
| Versamid 930 | 0.6 | 0.03 |
| Do | 1.8 | 0.01 |
| Versamid 940 | 0.6 | 0.03 |
| Versamid 950 | 0.6 | 0.04 |
| Malonamide | 1.0 | 0.04 |
| Terpolymer 38-35-27 | 0.6 | 0.03 |
| Do | 1.0 | 0.02 |

The first line of the table gives the result of a control test without stabilising compound; the three last lines give the results obtained with the known stabilising compounds mentioned above, the disadvantages of which have been discussed. The value of $K_{222}$ in percent per minute represents the quantity of product which is decomposed at 222° C. per minute.

We claim:
1. A process for the stabilization of polyoxymethylenes which comprises adding to a polyoxymethylene from 0.5 to 2.0% by weight thereof of a polyamide obtained by the condensation of a dimer or trimer of an unsaturated fatty acid containing at least 10 carbon atoms with at least the stoichiometric quantity of a diamine or triamine.

2. A process according to claim 1 in which the polyoxymethylene contains an antioxidant.

3. A polyoxymethylene composition containing as a stabilizing agent, from 0.5 to 2% by weight, based on the weight of the polyoxymethylene, of a polyamide obtained by the condensation of a dimer or trimer of an unsaturated fatty acid containing at least 10 carbon atoms with at least the stoichiometric quantity of a diamine or triamine.

4. A polyoxymethylene composition according to claim 2, which also contains an antioxidant.

5. The polyoxymethylene composition of claim 3, in which the terminal hydroxy groups of the polyoxymethylene are esterified or etherified.

No references cited.

MURRAY TILLMAN, *Primary Examiner.*
PAUL LIEBERMAN, *Assistant Examiner.*